United States Patent [19]

Berisch

[11] 4,313,642

[45] Feb. 2, 1982

[54] CONTROL VALVE FOR VEHICLE BRAKE SYSTEMS HAVING TWO BRAKE CIRCUITS

[75] Inventor: Volker Berisch, Hattersheim, Fed. Rep. of Germany

[73] Assignee: ITT Industries, Inc., New York, N.Y.

[21] Appl. No.: 155,828

[22] Filed: Jun. 2, 1980

[30] Foreign Application Priority Data

Jun. 30, 1979 [DE] Fed. Rep. of Germany ....... 2926539

[51] Int. Cl.³ .......................... B60T 8/02; B60T 8/26
[52] U.S. Cl. ..................................... 303/6 C; 188/349
[58] Field of Search ..................... 303/6 C, 6 R, 84 R, 303/84 A; 188/349, 151 A, 345

[56] References Cited

U.S. PATENT DOCUMENTS 3,606,487 9/1971 Kersting ............................. 303/6 C
3,614,169 10/1971 Bueler ................................ 303/6 C

FOREIGN PATENT DOCUMENTS 2427506 1/1975 Fed. Rep. of Germany .

*Primary Examiner*—Douglas C. Butler

*Attorney, Agent, or Firm*—John T. O'Halloran; Alfred C. Hill

[57] ABSTRACT

The control valve includes a pressure sensing piston disposed in a housing bore having a first active surface exposed to pressure of the front wheel brake circuit and a second active surface exposed to pressure of the rear wheel brake circuit, the second active surface being smaller than the first active surface. A stepped piston having an axial bore therein communicating with the rear wheel brake circuit is also disposed in the housing bore with the smaller diameter portion thereof being axially guided in a bore of the sensing piston. The end of the axial bore of the stepped piston in the bore of the sensing piston provide a valve seat and the sensing piston causes a valve closing member to effect a reduction of pressure in the rear wheel brake circuit when a given brake pressure is achieved. A single spring is disposed relative to the two pistons to bias the two pistons away from each other, to establish the switching point for pressure reduction, and to maintain the valve open should the front wheel brake circuit fail.

16 Claims, 1 Drawing Figure

U.S. Patent
Feb. 2, 1982
4,313,642
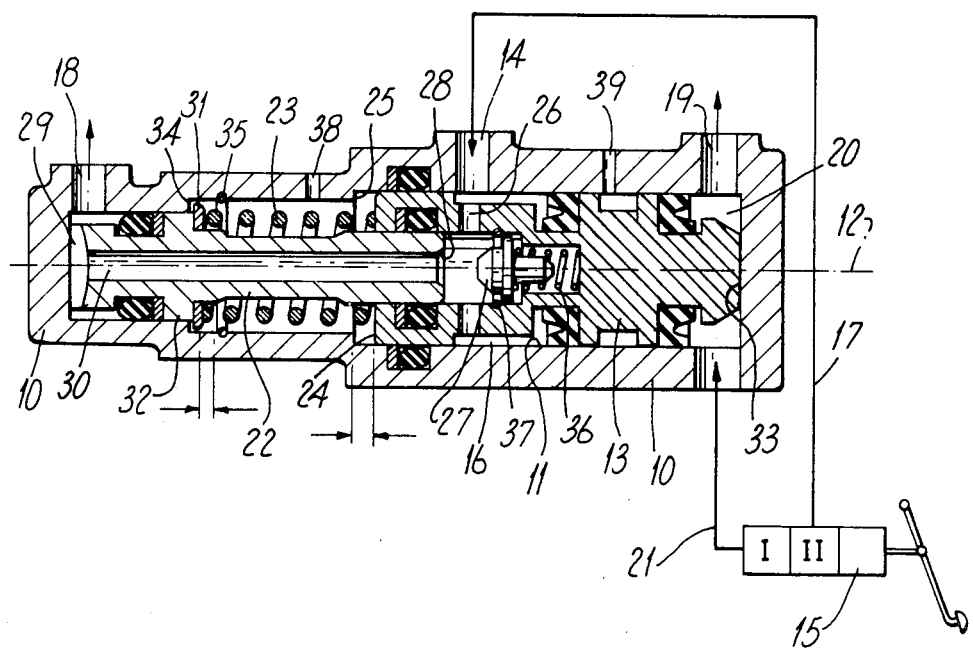

CONTROL VALVE FOR VEHICLE BRAKE SYSTEMS HAVING TWO BRAKE CIRCUITS

BACKGROUND OF THE INVENTION

The present invention relates to a control valve for vehicle brake systems having two brake circuits, wherein the full operating pressure is led into the one (first) of the two brake circuits when the pressure drops in the other (second) of the two brake circuits. The control valve incorporates a pressure reducing valve arranged in the pressure medium connection from the master cylinder to the first circuit and effects the control, the pressure reducing valve including at least one stepped piston and one sensing piston and in which the pistons are arranged in a common bore and are moveable towards one another.

Control valves of this type and of similar types are known, e.g. from German Pat. DE-OS No. 24 27 506, in which, however, the sensing part for determination of the pressure drop is also actuated by the controlled pressure in the first circuit and is accordingly dependent on the respective state of control. Furthermore, this known valve does not guarantee the movement of all seals in an efficient brake.

SUMMARY OF THE IINVENTION

An object of the present invention is to avoid the aforementioned disadvantages. The present invention shall in particular render possible a control unit having a short overall length, which is of simple design, works safely and can be produced at a slight cost.

The advantages offered by the control valve of the present invention will become obvious from the description that follows.

A feature of the present invention is the provision of a control valve for vehicle brake systems having two brake circuits to control the application of full operating pressure to a first of the two brake circuits when pressure drops in a second of the two brake circuits comprising: a pressure reducing valve disposed in a pressure medium connection from a master cylinder to the first of the two brake circuits to effect the control, the reducing valve including a pressure sensing piston disposed in a housing bore coaxial of a longitudinal axis of the housing bore movable in a first direction, the sensing piston having a first active surface exposed to uncontrolled pressure of the first of the two brake circuits and a second active surface exposed to uncontrolled pressure of the second of the two brake circuits, the first active surface being smaller than the second active surface, a stepped piston diposed in the housing bore coaxial to the axis movable in a direction opposite the first direction, the smaller diameter portion of the stepped piston being slidably sealed in a first bore in the adjacent end portion of the sensing piston, and a spring acting on the sensing piston and the stepped piston.

In the pressure medium passage from the master cylinder to the wheel cylinders of the first circuit a pressure reducing valve effecting the control is located, both parts (valve seat and valve closing element) of the pressure reducing valve are disposed in a common bore and the pistons are moveable towards one another. The first piston supporting the valve seat is designed as a stepped piston and contains a channel, which is part of the pressure medium connection from the master cylinder to the wheel cylinders of the first circuit. The configuration of the step is such that the wheel cylinder pressure in the first circuit is applied to a greater surface of the piston than the master cylinder pressure, which is applied to the piston end assigned to the valve. The second piston has a bore on the side facing the first piston and in this bore the smaller step of the first piston is guided. At the second piston the influence of the pressure in the second circuit balances out the pressure produced by the master cylinder in the first circuit.

The second piston is exposed to the pressure of the second brake circuit and to the uncontrolled pressure of the first brake circuit and the second piston influences the first brake circuit when the pressure drops in the second brake circuit. Thus, the second piston always reacts immediately and constantly and in a manner unhindered by the condition of the pressure reducing valve.

BRIEF DESCRIPTIION OF THE DRAWING

The above-mentioned and other features and objects of the present invention and the manner of obtaining them will become more apparent by reference to the following description taken in conjunction with the drawing, the single Figure of which is a longitudinal cross-sectional view of an embodiment of a control valve in accordance with the principles of the present invention. The individual elements are to a great extent recognizable as to their shape and function by their graphic representation.

DESCRIPTION OF THE PREFERRED EMBODIMENT

Referring to the Figure, a bore 11 is disposed in a housing 10 coaxial of longitudinal axis 12. Bore 11 as well as the bodies of firm material positioned therein are symmetrical with respect to axis 12. Bore 11 is subdivided by an axially movable stepped sensing piston 13 into a chamber 16 connected to the tandem master cylinder 15 by means of a connection 14 and into a chamber 20 connected to the tandem master cylinder 15. The arrangement described is preferably utilized in the brake system of a motor vehicle. The line 17 related to the rear-axle brake circuit runs from a chamber II of master cylinder 15 to connection 14. The outlet 18 leads to the wheel cylinders of the rear-axle brakes. The pressure line leading to the wheel cylinders of the front-axle circuit is connected to housing 10 at outlet 19 which is connected to chamber 20, which is separated from chamber 16 by piston 13.

The connection between the brake line of the front axle circuit and the master cylinder can be realized in the manner illustrated, that is the pressure medium connection leads from chamber I of master cylinder 15 to the wheel cylinders of the front axle through a line 21 and chamber 20 to outlet 19 and from there to the wheel cylinders. However, it is also possible to connect line 21 directly to the wheel cylinders and to connect chamber 20 to the front-axle brake circuit only by outlet 19.

Chamber 16 is on its side facing chamber 20 entirely closed by partition parts of piston 13 and on its side facing outlet 18 it is partly defined by partitions of piston 13. However, in the middle part chamber 16 is defined by the front surface and the axle bore of a stepped piston 22. Stepped piston 22 has its smaller diameter end axially guided in a corresponding axial bore in the left end of piston 13 and is sealed thereto. As the position of the diameters and the seals shows, piston 13 has the pressure at outlet 19 applied to the total cross section of chamber 20. The pressure in chamber 16 acts on a smaller surface, since the full cross section of bore 11 is reduced to the cross section surface of the right end of piston 22. When there is equal pressure in inlet 14 and outlet 19, piston 13 moves against the force of a coil spring 23 to the left until its front surface 24 abuts against a step 25 in the surface of bore 11. Chamber 16 includes an outer annular chamber and the bore receiving the right end of piston 22. These two chamber parts are connected to one another by cross bores 26. Under certain conditions still to be described the pressure reducing valve including a valve body 27 and an edge 28 here designated as a value seat separates chamber 16 from a chamber always connected to outlet 18. This latter chamber includes a longitudinal bore 30 in piston 22 and the chamber 29 adjacent to the left end of the piston 22. Bleeding bores 38 and 39 lead to the atmosphere. Their position and function follow from the drawing. Spring 23 abuts with its one end against the front side of piston 13 and with its other end it abuts against a ring disc 31 on a step 32 of piston 22. Spring 23 thus presses these two pistons apart in the axle direction. In a pressureless condition, spring 23 presses piston 13 against the right partition 33 of bore 11 and piston 22 until ring disc 31 abuts against step 32. The hydraulically active cross section of piston 22 at its left end is, as shown by the drawing, the cross section of chamber 29 and, consequently, is larger than the active cross section at its right end, which is determined by the guiding bore in piston 13. When there is equal pressure on both sides of piston 22, which is the case when the valve 27, 28 is completely open, stepped piston 22 is pressed to the right into stepped piston 13 against the force of spring 23. A circlip 35 limits this movement in case of falure of the front axle circuit. The valve body 27 is held by a relatively weak spring 36 against a stop formed by a circlip 37 disposed in piston 13.

The operation of the arrangement described is as follows. In the pressureless condition, spring 23 presses pistons 13 and 22 apart into their rest position at stops 33 and 34. The passage from line 17 and inlet 14 through chamber 16, bore 30, chamber 29 and outlet 18 to the rear wheel brake cylinders is open. A reduction in pressure by valve 28, 27 is not effected since these two elements are disposed far apart. When master cylinder 15 is operated, the hydraulic pressure propagates to the brake cylinders together with a relatively slight streaming of liquid. Since the channel is open between inlet 14 and outlet 18, the uncontrolled pressure of both brake circuits is present on both sides of sensing piston 13. Piston 13 will move to the left towards piston 22, until it abuts against stop 25 with its front surface 24 and has thereby reached its ready position. An increase in pressure in the rear axis brake circuit and, thus, in chamber 29, 30 causes, due to the cross section-gradation of piston 22, a movement of piston 22 to the right against the prestressing force of spring 23 until the closing position of valve 27, 28 is reached. Now a decrease in pressure in chamber 29 according to the relation of the pressure-applied active surface of piston 22 sets in. With further increase in pressure in inlet 14, valve 27, 28 is opened again, wherein pressure medium can flow into the chamber 29. Thereupon valve 27, 28 is closed again.

As shown, at the beginning of braking the wheel cylinders of the rear axle brake circuit are actuated by unreduced brake pressure and when a predetermined pressure is reached they are actuated by reduced brake pressure. If the rear axle brake circuit fails, there is no change regarding the front axle brake circuit and, consequently, no change regarding the efficiency of the front wheel brakes.

If on the other hand the front axle brake circuit fails, piston 13 is moved to the right into its rest position, or is kept there. Valve 27, 28 cannot close in this position of piston 13, since the sliding movement of piston 22 is limited by circlip 35.

An advantage of this new arrangement is that only one control spring is necessary, here spring 23. Spring 36 only serves for the elastic support of valve body 27. Spring 23 also effects the returning of stepped piston 22 as well as of pressure sensing piston 13. Piston 13 is with the building-up of pressure shifted into its ready position, which at the same time has the advantage that apart from all other seals its seals are moved, too. Thereby, it is avoided that the seals age unnoticed, or become defective in some other way. This new arrangement requires extremely little construction space.

The axial distances and the axial position of the parts determining the axial movement, in particular the stops 34, 35, 25 and 24 and 37 follow from the mode of operation described. A loss of volume in the brake circuit of the rear axle when the front axle brake circuit fails, is neglectable, since sensing piston 13 makes only a slight movement until it abuts against partition 33. With the next operation of the brake pedal no further loss in volume occurs.

While I have described the principles of my invention in connection with specific apparatus it is to be clearly understood that this description is made only by way of example and not as a limitation to the scope of my invention as set forth in the objects thereof and in the accompanying claims.

I claim:

1. A control valve for vehicle brake systems having two brake circuits to control the application of full operating pressure to a first of said two brake circuits when pressure drops in a second of said two brake circuits comprising:
   a pressure reducing valve disposed in a pressure medium connection from a master cylinder to said first of said two brake circuits to effect said control, said reducing valve including
   a pressure sensing piston disposed in a housing bore coaxial of a longitudinal axis of said housing bore movable in a first direction, said sensing piston having a first active surface exposed to uncontrolled pressure of said first of said two brake circuits and a second active surface exposed to uncontrolled pressure of said second of said two brake circuits, said first active surface being smaller than said second active surface,
   a stepped piston having at least one large diameter portion and at least one smaller diameter portion disposed in said housing bore coaxial to said axis movable in a direction opposite said first direction, an end portion of said smaller diameter portion being slidably sealed in a first bore in the adjacent end portion of said sensing piston, and
   a spring disposed about said smaller diameter portion acting on said sensing piston and said stepped piston.

2. A valve according to claim 1, further including a plurality of stops disposed in said housing bore to limit the movement of said sensing piston and said stepped piston towards each other.

3. A valve according to claim 2, wherein one of said plurality of stops includes a step in said housing bore to define the position of said sensing piston to effect a pressure reduction in said first of said two brake circuits.

4. A valve according to claim 3, wherein
said spring acts as a return spring for said sensing piston and said stepped piston and as a control spring determining when said pressure reduction occurs.

5. A valve according to claim 4, wherein
said stepped piston has a second bore coaxial of said axis extending therethrough to provide a passage between an inlet coupled to said master cylinder and an outlet coupled to said first of said two brake circuits.

6. A valve according to claim 5, further including
a valve seat disposed in the end of said second bore within said first bore, and a valve closing member for said valve seat disposed in said first bore.

7. A valve according to claim 1, wherein
a step is disposed in said housing bore to define the position of said sensing piston to effect a pressure reduction in said first of said two brake circuits.

8. A valve according to claim 7, wherein
said spring acts as a return spring for said sensing piston and said stepped piston and as a control spring determining when said pressure reduction occurs.

9. A valve according to claim 8, wherein
said stepped piston has a second bore coaxial of said axis extending therethrough to provide a passage between an inlet coupled to said master cylinder and an outlet coupled to said first of said two brake circuits.

10. A valve according to claim 9, further including
a valve seat disposed in the end of said second bore within said first bore, and a valve closing member for said valve seat disposed in said first bore.

11. A valve according to claim 1, wherein
said spring acts as a return spring for said sensing piston and said stepped piston and as a control spring determining when a pressure reduction occurs.

12. A valve according to claim 11, wherein
said stepped piston has a second bore coaxial of said axis extending therethrough to provide a passage between an inlet coupled to said master cylinder and an outlet coupled to said first of said two brake circuits.

13. A valve according to claim 12, further including
a valve seat disposed in the end of said second bore within said first bore, and a valve closing member for said valve seat disposed in said first bore.

14. A valve according to claim 1, wherein
said stepped piston has a second bore coaxial of said axis extending therethrough to provide a passage between an inlet coupled to said master cylinder and an outlet coupled to said first of said two brake circuits.

15. A valve according to claim 14, further including
a valve seat disposed in the end of said second bore within said first bore, and a valve closing member for said valve seat disposed in said first bore.

16. A control valve for vehicle brake systems having two brake circuits to control the application of full operating pressure to a first of said two brake circuits when pressure drops in a second of said two brake circuits comprising:
a pressure reducing valve disposed in a pressure medium connection from a master cylinder to said first of said two brake circuits to effect said control, said reducing valve including
a pressure sensing piston disposed in a housing bore coaxial of a longitudinal axis of said housing bore movable in a first direction, said sensing piston having a first active surface exposed to uncontrolled pressure of said first of said two brake circuits and a second active surface exposed to uncontrolled pressure of said second of said two brake circuits, said first active surface being smaller than said second active surface,
a stepped piston having at least one large diameter portion and at least one smaller diameter portion disposed in said housing bore coaxial of said axis movable in a direction opposite said first direction, said smaller diameter portion being slidably sealed in a first bore in the adjacent end portion of said sensing piston, said stepped piston having a second bore coaxial of said axis extending therethrough to provide a passage between an inlet coupled to said master cylinder and an outlet coupled to said first of said two brake circuits,
a valve seat disposed in the end of said second bore within said first bore,
a valve closing member for said valve seat disposed in said first bore, and
a spring acting on said sensing piston and said stepped piston.

* * * * *